(12) United States Patent
Scobey et al.

(10) Patent No.: US 6,896,949 B1
(45) Date of Patent: *May 24, 2005

(54) WAFER SCALE PRODUCTION OF OPTICAL ELEMENTS

(75) Inventors: Michael A. Scobey, Santa Rosa, CA (US); Lucien P. Ghislain, San Rafael, CA (US); Dennis J. Derickson, Windsor, CA (US); Loren F. Stokes, Santa Rosa, CA (US)

(73) Assignee: Bookham (US) Inc., Abington (GB)

( * ) Notice: Subject to any disclaimer, the term of this patent is extended or adjusted under 35 U.S.C. 154(b) by 66 days.

This patent is subject to a terminal disclaimer.

(21) Appl. No.: 10/096,031

(22) Filed: Mar. 12, 2002

Related U.S. Application Data

(60) Provisional application No. 60/276,020, filed on Mar. 15, 2001.

(51) Int. Cl.⁷ ............................ G02B 27/00; G02F 1/03; G02F 1/07
(52) U.S. Cl. ...................... 428/173; 359/578; 359/577; 359/260
(58) Field of Search ............................... 359/578, 577, 359/260

(56) References Cited

U.S. PATENT DOCUMENTS

| | | | |
|---|---|---|---|
| 4,756,606 A | * 7/1988 | Jewell et al. | 359/241 |
| 5,238,532 A | 8/1993 | Zarowin et al. | 156/643 |
| 5,254,830 A | 10/1993 | Zarowin et al. | 219/121.43 |
| 5,283,845 A | 2/1994 | Ip | 385/24 |
| 5,290,382 A | 3/1994 | Zarowin et al. | 156/345 |
| 5,336,355 A | 8/1994 | Zarowin et al. | 156/345 |
| 6,074,947 A | 6/2000 | Mumola | 438/689 |
| 6,110,337 A | 8/2000 | Sullivan et al. | 204/298 |
| 6,125,220 A | 9/2000 | Copner et al. | 385/27 |
| 6,159,083 A | 12/2000 | Appel et al. | 451/289 |
| 6,159,388 A | 12/2000 | Yanagisawa et al. | 216/60 |
| 6,169,088 B1 | 1/2001 | Matsuno et al. | 514/253 |
| 6,658,172 B1 | * 12/2003 | Scobey et al. | 385/15 |

* cited by examiner

Primary Examiner—Harold Pyon
Assistant Examiner—Catherine A. Simone
(74) Attorney, Agent, or Firm—Banner & Witcoff, Ltd.

(57) ABSTRACT

Improved optical element wafers comprising stacked, optically coupled etalon wafers are disclosed. Each etalon wafer comprises a bulk optic wafer defining the optic cavity between selectively transparent thin film mirror coatings. The bulk optic wafer comprises an optically transparent body, such as a portion of a substrate wafer, along with a wedge correcting coating on at least one of the two surfaces of the optically transparent body and/or a thickness-adjustment layer on one or both surfaces. The bulk optic wafer is a solid, self-supporting body, optically transparent (at the wavelength or wavelengths of interest), whose thickness, i.e., the dimension between the selectively transparent surfaces, defines the cavity spacing of the bulk optic etalon wafer. Methods of making and using the optical element wafers are also disclosed.

21 Claims, 11 Drawing Sheets

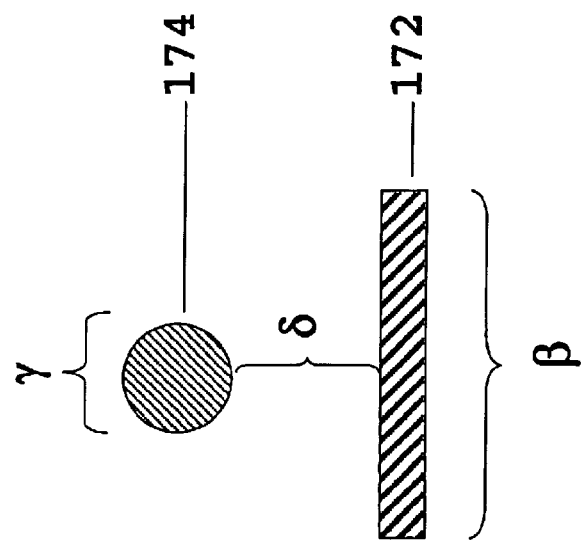
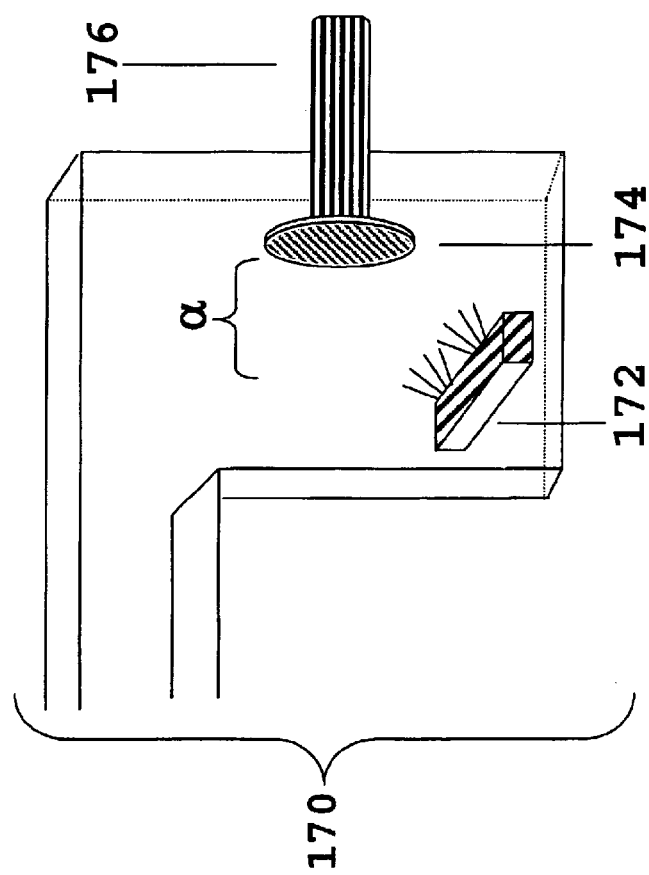
Fig. 3b
Fig. 3a

WAFER SCALE PRODUCTION OF OPTICAL ELEMENTS

PRIORITY APPLICATION

This application claims the benefit of U.S. Provisional Application No. 60/276,020 filed on Mar. 15, 2001 and titled "Wafer Scale Production of Optical Elements."

CROSS-REFERENCED APPLICATIONS

This application is related to commonly assigned U.S. Provisional Application No. 60/275,939 filed on Mar. 15, 2001 and titled "Apparatus and Method for Vacuum Coating Deposition," U.S. Provisional Application No. 60/276,022 filed on Mar. 15, 2001 and titled "Optical System With 1×N Interleaver and Methods of Making and Using Same," U.S. Provisional Application No. 60/275,918 filed on Mar. 15, 2001 and titled "Optical System With Cascaded Interleavers and Methods of Making and Using Same," U.S. Provisional Application No. 60/276,018 filed on Mar. 15, 2001 and titled "Optically Coupled Etalons and Methods of Making and Using Same," U.S. Provisional Application No. 60/275,920 filed on Mar. 15, 2001 and titled "Iso-Optical Thermal Compensator and Methods of Making and Using Same," U.S. Provisional Application No. 60/275,998 filed on Mar. 15, 2001 and titled "Methods of Making Optical Etalons," U.S. Provisional Application No. 60/276,017 filed on Mar. 15, 2001 and titled "Optical System With Interleaver and Methods of Making and Using Same," U.S. Provisional Application No. 60/275,997 filed on Mar. 15, 2001 and titled "Optical Filter Elements and Methods of Making and Using Same," U.S. Provisional Application No. 60/276,019 filed on Mar. 15, 2001 and titled "Optical Etalons and Methods of Making and Using Them," U.S. Provisional Application No. 60/276,023 filed on Mar. 15, 2001 and titled "Air Space Variable Optical Etalons and Methods of Making and Using Same," U.S. Provisional Application No. 60/275,945 filed on Mar. 15, 2001 and titled "Air Space Optical Etalons and Methods of Making and Using Same," and U.S. Provisional Application No. 60/276,316 filed on Mar. 16, 2001 and titled "Optical Monitoring of Thin Film Deposition Thickness," the entire disclosure of each of which is hereby incorporated herein by reference for all purposes.

INTRODUCTION

This application relates to wafer scale production of optical element wafers. More particularly, this application relates to wafer scale production of optical element wafers whose diced components are suitable for use in the telecommunications industry.

BACKGROUND

Etalons are ubiquitous in optical systems, such as optical sensors, optical communication systems, etc. The basic Fabry-Perot etalon can be designed and produced to have a sharp response at resonant frequencies, which makes them suitable as optical filters such as bandpass filters. They also give a variable amount of dispersion, and so have been suggested for possible use as dispersion compensators. Thus Fabry-Perot etalons are a basic building block in a number of different optical elements, i.e., in optically functional components or devices. Such devices may be active or passive and may be employed in a system (or adapted to be employed in a system) to pass or transmit a selective wavelength or band of wavelengths or periodic set of wavelength bands. Exemplary optical elements in which etalons are used include optical sensors, and filters, e.g., band pass filters, single channel filters, and other wavelength selective filter devices such as wavelength division multiplexers, and dispersion compensators and other components of optical communication systems.

Etalons typically comprise precisely parallel selectively transmissive surfaces such as thin films, i.e., partially reflective mirrors or surfaces on opposite sides of an integral number of half waves distance or gap between them, forming the etalon's cavity. The thin film and cavity characteristics determine the optical properties of the etalon. That is, the spectral characteristics of the etalon are generally determined by the reflectivity of the mirrors or surfaces and by the optical thickness of the cavity length. Such etalons have long been produced, for example, by sputter deposition of film stacks of alternating layers of materials, i.e. a high refractive index material alternating with a low refractive index material, to form a mirror coating, which is transmissive of selected wavelengths. Two such mirror coatings sandwich a sputter-deposited cavity layer between them. Sputtering or other physical vapor deposition of the relatively thick cavity layer is time consuming and, therefore adds substantial time and cost to the production of such etalons. The result is undesirably high cost for production for such etalons.

It has long been a recognized problem in this industry, that producing etalons having desired properties can be difficult and expensive. In addition, there are industry-recognized problems associated with producing structurally robust etalons having desired, precise optical properties. Prior known etalons have employed various designs, such as the etalons used in the interferometric optical devices of U.S. Pat. No. 6,125,220 to Copner et al. In the interleaver/de-interleaver devices, of Copner et al, two glass interferometric end plates are separated by a spacer region where the etalon is formed. The spacer region is an air gap having a predetermined dimension. In adjustable Fabry-Perot devices, such as those disclosed in U.S. Pat. No. 5,283,845 to Ip, tuning of the center wavelength of the spectral passband of an etalon is achieved by varying the effective cavity length (spacing) between two end plates carrying thin film reflectors. More specifically, in Ip a piezo actuator is used, extending between the two end plates. By varying the electric power applied to the piezo actuator, the axial length of the actuator can be varied, and thus the gap between the end plates varied. As alternatives to piezoelectric actuators, the tuning mechanism may include liquid crystals, temperature, pressure, and other mechanisms. It is a disadvantage that adjustable etalons as in Ip involve considerable assembly complexity and cost. Also, maintaining strict parallelism between the end plates can present additional difficulties.

The prior known optical etalons, as noted above, fail to fully meets the needs of many applications, especially for optical elements intended for optical communication systems, precision sensors, etc.

It is an object of the present invention to provide optical element wafers addressing some of the deficiencies of the prior known technologies. It is a particular object of at least certain preferred embodiments, to provide stacked, optically coupled etalon wafers which have been produced from a wafer scale process. Additional objects and aspects of the invention and of certain preferred embodiments of the invention will be apparent from the following disclosure and detailed description.

SUMMARY

In accordance with a first aspect, an optical element wafer comprises multiple Fabry-Perot etalon wafers stacked and optically coupled. The etalon wafers may be placed in optical contact, i.e. the thin film coatings of an etalon wafer in direct and substantially continuous surface-to-surface contact with the thin film coatings of an adjacent etalon wafer in the stack, or may be placed in contact using one or more bonding layers between adjacent etalon wafers. As used here, a bonding layer is any layer of bonding material on a surface of an etalon wafer and used to physically attach that etalon wafer to an adjacent etalon wafer.

In accordance with another aspect, one or more etalon wafers of the stacked, optically coupled etalon wafers, preferably each etalon wafer, comprises a bulk optic wafer having first and second parallel, selectively transparent surfaces. The bulk optic wafer comprises a solid optically transparent body (at the wavelengths of interest) and optionally comprises a wedge correcting coating (referred to here generally as a "wedge coating") and/or a thickness-adjustment layer on at least one of the two surfaces of the optically transparent body. In preferred embodiments, the diameter of the wafer is preferably at least 1 inch. In other embodiments, the diameter of the wafer is preferably greater than 2 inches, for example 3 inches. The wedge coating, further described below, establishes high precision parallelism of the selectively transparent surfaces of the etalon wafer. The thickness of the bulk optic wafer (including any wedge coating), i.e., the dimension between the selectively transparent, parallel surfaces, defines the cavity spacing. Preferably, the bulk optic wafer, including the wedge coating, will typically have an optical thickness equal to an integral number of half waves for the wavelength of interest. In preferred embodiments the selectively transparent surfaces are thin film mirror coatings comprising, for example, a film stack of alternating high and low refractive index oxides or a metal thin film in accordance with known thin film technologies.

If a wedge coating is deposited, the thickness of the wedge coating varies progressively across the etalon wafer. That is, the thickness of the wedge coating, viewed in cross-section in at least one plane orthogonal to the parallel, selectively transparent surfaces of the etalon wafer, has a thickness that increases (or decreases in the opposite direction) continuously, typically approximately linearly, to compensate for non-parallelism, or "wedge", in the underlying body of the bulk optic wafer. As described further below, a bulk optic etalon wafer can be diced into individual etalons after optionally depositing a wedge coating and two thin film coatings, by magnetron sputtering, ion beam sputtering or other known deposition techniques, on the surfaces of the bulk optic wafer, and the individual etalons may be stacked and optically coupled. Preferably, surface polishing is performed to first polish the wafer, for example, a silica wafer suitable for optical filter production, to parallelism within 1 to 2 arc seconds and wavefront error of less than $\frac{1}{50}$ (2.0%) of a wave at the wavelength of interest. Numerous polishing techniques and polishing apparatus may be used to polish the wafer including but not limited to chemomechanical polishing and chemomechanical apparatus, such as those manufactured by Strasbaugh (San Luis Obispo, Calif.) and Applied Materials, Inc (Santa Clara, Calif.). For an etalon wafer (in the stacked, optically coupled etalon wafers) intended for use as or in an optical element in an optical telecommunication system, the wavefront error will preferably be less than $\frac{1}{50}$ of a wave at 1550 nm. Low wavefront error can be understood in this context to mean that the thickness of the bulk optic wafer, i.e., the distance between the two opposite surfaces of the bulk optic wafer, is substantially linearly variable and, hence, controllable or correctable by the wedge coating in accordance with the present disclosure. Preferably, for etalon wafers suitable for use in optical communication elements, the wedge coating brings parallelism of the opposite surfaces of the bulk optic wafer from the 1 to 2 arc seconds of wedge mentioned above to less than 0.1 arc seconds, most preferably less than 0.01 arc seconds.

In accordance with a method aspect of the present disclosure, the wedge coating is deposited onto the optically transparent body of the bulk optic wafer by physical vapor deposition, e.g. magnetron sputtering or ion beam sputtering in a vacuum chamber, with the bulk optic wafer not spinning during deposition. Preferably the coating is a low defect coating to allow optical contact bonding or other optical coupling of the etalon wafers. Deposition can be otherwise in accordance with known techniques, whose applicability and manner of implementation will be within the ability of those skilled in the art given the benefit of this disclosure. The substrate is oriented at an angle to the target or otherwise arranged to receive progressively different deposition rates from one edge to the opposite edge. The target is preferably an elongate source to provide a coating with a roughly linear profile. Preferably, the target is tangential to the circumference of the substrate and is about four times as large as the substrate, e.g. for a 6 inch diameter substrate the target can be about 20 inches long. The thinnest point of the substrate is positioned closest to the target or otherwise oriented or favored to have the fastest rate of deposition. Conversely, the thickest point is positioned or oriented to have the lowest deposition rate. Thus, the sputtered material will deposit fastest and, therefore, the most heavily, i.e., the thickest, where the bulk optic was thinnest, with progressively thinner deposition toward the area where the least was wanted. Since the substrate is not spinning and is oriented or arranged as just described, the thickness of the resulting wedge coating will change progressively (hence the term "wedge"), with the change in the thickness of the wedge coating being opposite that of the underlying body. The net effect is that the thickness of the bulk optic wafer is substantially uniform over all or a large portion of its area. Thin films can then be deposited to complete the etalon wafer (subject to any further production or packaging steps, such as stacking and optically coupling the etalon wafers, etc.) in the same or a different sputter deposition chamber. Deposition of a wedge coating and thin films on another, second surface of the bulk optic wafer may be performed in accordance with the embodiments described here.

In other embodiments, the wedge coating may be omitted from the surface(s) of the bulk optic wafer, and preferential chemical etching may be performed, prior to deposition of the two thin film coatings and prior to stacking and optically coupling the etalon wafers, to render the surfaces of the bulk optic wafer substantially parallel. Preferably, preferential chemical etching means using plasma assisted chemical etching (PACE), reactive ion etching (RIE), inductively coupled plasma (ICP) etching, or combinations thereof to etch the surfaces of the bulk optic wafer so the surfaces are substantially parallel. More preferably, preferential chemical etching means sequentially etching sub-sections, optionally overlapping sub-sections, of a substantially planar surface of a substantially transparent bulk optic wafer, e.g. a silica wafer such as is typically used to product optical filters and other optical elements, to remove more material of the bulk optic wafer from some portions of the bulk optic wafer than from other portions, so as to reduce its thickness at those portions more than at other portions, so as to render the etched surface of the bulk optic wafer more precisely parallel to an opposite surface of the bulk optic wafer. Most preferably, preferential chemical etching means using PACE to etch the surfaces of the bulk optic wafer so the surfaces are substantially parallel. This etching and monitoring of surface uniformity of the bulk optic wafer may be performed using the methods for performing PACE and chemical etching that are disclosed in U.S. Pat. Nos. 5,290,382, 5,238,532, 5,336,355, 5,254,830, 6,074,947 and 6,159,388, the entire disclosures of which are hereby incorporated by reference, or other suitable chemical etching methods. Following preferential chemical etching or prior to preferential chemical etching, the surfaces of the bulk optic wafer may be polished to remove any contaminants. Preferably, prior to preferential etching a rough polishing step is used. The rough polishing step provides for removal of large amounts, preferably between 10 to 50 µm, for example, of surface material. Preferably, after etching a final touch polishing step is used. The difference in the rough polishing and the final touch polishing is the amount of material that is removed. Specifically, less material, 0.1 to 0.5 µm, for example, is removed with the final touch polishing than is removed with the rough polishing. More preferably, polishing is performed using chemical mechanical polishing, also referred to as in some instances here as chemomechanical polishing. The polishing steps may be performed using the apparatus and methods described in U.S. Pat. Nos. 6,169,088 and 6,159,083, the entire disclosures of which are hereby incorporated by reference. Suitable polishing apparatus will be apparent to those skilled in the art, given the benefit of this disclosure.

In accordance with another aspect, a bulk optic wafer, suitable for use in stacked, optically coupled etalon wafers, comprises a planar bulk optic wafer having first and second selectively transparent surfaces and a thickness-adjustment layer of substantially uniform thickness on at least one of the two surfaces of the optically transparent body of the wafer. As used here, substantially uniform thickness means the thickness of the layer across the surface of the bulk optic wafer is approximately constant. The thickness-adjustment layer, further described below, establishes the desired thickness of the bulk optic wafer. The bulk optic wafer is a solid, optically transparent (at the wavelength or wavelengths of interest) body whose thickness, i.e., the dimension between the selectively transparent surfaces, including the thickness-adjustment layer coating (and any wedge coating), defines the cavity spacing. In particular, the bulk optic wafer, including the thickness-adjustment layer, will typically have an optical thickness equal to an integral number of half-waves at same or all points for the wavelength(s) of interest. In preferred embodiments the selectively transparent surfaces are thin film coatings comprising, for example, a film stack of alternating high and low refractive index oxides or a metal thin film in accordance with known thin film technologies. In certain embodiments, light that is incident on the selectively transparent surfaces of the stacked, optically coupled etalon wafers, or diced components thereof, has an angle of incidence preferably $\leq 1°$. One skilled in the art, given the benefit of this disclosure will be able to select an angle of incidence suitable for intended use and applications. Suitable fittings for launching light include, for example, a dual fiber collimator, a pair of single fiber collimators, an optical circulator, a 50/50 splitter used with a single fiber collimator, a fiber pigtail and the like. As described further below, the bulk optic wafer can be diced into individual optical elements after deposition of a thickness-adjustment layer and the two thin film coatings (and after joining of the etalon wafers in the case of stacked, optically coupled etalon wafers). The thickness-adjustment layer and thin film coatings may be deposited by magnetron sputtering, ion beam sputtering or other known deposition techniques. Preferably, surface polishing is performed to first polish the wafer, for example, a silica wafer suitable for optical filter production, to parallelism within 1 to 2 arc seconds and wavefront error of less than $\frac{1}{50}$ (2.0%) of a wave at the wavelength of interest. For optical element wafers and optical elements intended for use as or in an optical element in an optical telecommunication system, the wavefront error will preferably be less than $\frac{1}{50}$ of a wave at 1550 nm. In accordance with a further method aspect of the present disclosure, the thickness-adjustment layer is deposited by physical vapor deposition, most preferably magnetron or ion beam sputtering in a vacuum chamber, with the bulk optic wafer (alone or as part of a larger substrate, such as a typical substrate wafer used in the production of optical filters) spinning during deposition in accordance with known techniques. From the disclosure above of optical elements comprising a bulk optic wafer with a wedge coating as the cavity of the optical element wafer, it will be apparent to those skilled in the art that embodiments of the present invention comprising a bulk optic wafer with a thickness-adjustment layer and no wedge coating can be expected to have non-parallel surfaces carrying the optical thin films, e.g. a variable etalon wafer comprising a thickness-adjustment layer. The consequent impact on optical properties of the optical elements diced from the optical element wafers may be addressed in accordance with suitable techniques, such as tilting of the optical element in use. Selected areas of the optical element wafers may provide optical properties meeting product specifications for an intended application.

In accordance with a method aspect of the present disclosure, the thickness adjustment layer is deposited onto the optically transparent body of the bulk optic wafer by physical vapor deposition, e.g. magnetron or ion beam sputtering in a vacuum chamber, with the bulk optic wafer spinning during deposition in accordance with known techniques. Preferably the coating is a low defect coating to allow optical contact bonding or other optical coupling of the etalon wafers. Deposition can be otherwise in accordance with known techniques, whose applicability and manner of implementation will be within the ability of those skilled in the art given the benefit of this disclosure. The net effect is that the thickness of the bulk optic wafer is substantially uniform over all or a large portion of its area. Thin films can then be deposited to complete the etalon wafer (subject to any further production or packaging steps, such as stacking and optically coupling the wafers, etc.) in the same or a different sputter deposition chamber. From the disclosure above of optical elements comprising a bulk optic wafer and a wedge coating as the cavity of the optical element, it will be apparent to those skilled in the art that embodiments of the present invention comprising a bulk optic with a thickness adjustment layer and no wedge coating can be expected to have non-parallel surfaces carrying the optical thin films. The consequent impact on optical properties of the optical element wafer may be addressed in accordance with suitable techniques, such as tilting of the optical element wafer, or diced elements thereof, in use. Selected area of the optical element wafer may provide optical properties meeting product specification for an intended application.

In accordance with another aspect, each etalon wafer of the stacked, optically coupled etalon wafers, in accordance with the above disclosure, further comprises a wedge coating and a thickness-adjustment layer. As noted above, the properties of an etalon wafer will depend, in part, on the cavity spacing. Thus, in accordance with certain preferred embodiments, the thickness of the bulk optic wafer is adjusted, typically after deposition of the wedge coating, by follow-on deposition of a thickness-adjustment layer. In accordance with a further method aspect of the present disclosure, the thickness-adjustment layer is deposited by physical vapor deposition, most preferably magnetron sputtering or ion beam sputtering in a vacuum chamber, with the bulk optic wafer spinning during deposition in accordance with known techniques. In accordance with certain highly preferred embodiments, the wedge coating and then the thickness-adjustment layer are deposited onto the bulk optic wafer in a single continuous step. The wedge coating is deposited as described above, by deposition onto the bulk optic substrate not spinning in the vacuum chamber. Upon completion of the wedge coating, the bulk optic wafer is caused to commence spinning without interruption in deposition. Deposition is, therefore, continuous for the wedge coating and the thickness-adjustment layer. To control the optical thickness of the cavity formed by the bulk optic wafer, the thickness can be precisely monitored during deposition of the thickness-adjustment layer. Given the benefit of this disclosure, it will be within the ability of those skilled in the art to employ suitable techniques for monitoring and controlling the thickness of the bulk optic wafer as the thickness-adjustment layer is being deposited. Suitable optical monitoring techniques are known, including, for example, that disclosed in U.S. Pat. No. 6,110,337 to Sullivan et al., entitled *Sputtering Method and Apparatus with Optical Monitoring*, the entire disclosure of which is hereby incorporated by reference.

In accordance with another aspect, additional cavities can be deposited on either surface of a bulk optic etalon wafer, suitable for use in stacked, optically coupled etalon wafers, by suitable deposition techniques, such as, for example, ion beam sputtering, magnetron sputtering, etc. That is, additional cavities can be formed on the bulk optic etalon wafer. More specifically, following deposition of a suitable transition layer overlying the thin film stacks on either surface of the bulk optic etalon wafer, a cavity can be deposited by, for example, sputtering a first suitable thin film coating or stack, such as a sequence of alternating H/L/H film, followed by deposition of a cavity film, followed by deposition of a second thin film coating or stack which preferably is substantially identical to the first thin film coating. Similarly, yet one or more such thin film etalons can be deposited thereafter employing suitable odd QWOT transition layers between, in accordance with thin film principles well known to those skilled in the art. Thus, the advantage of improved optical performance characteristics of a multi-cavity wafer device can be achieved, incorporating a bulk optic etalon wafer of the type disclosed above together with additional thin film etalons unitary therewith by depositing such thin film etalons thereon using sputtering or other suitable deposition techniques. Any suitable materials disclosed above, and other suitable materials known to those skilled in the art, may be used for the thin films of the thin film etalons including but not limited to $Ta_2O_5$, $ZrO_2$, $TiO_2$, $Al_2O_5$, $SiO_2$, and MgF. The multi-cavity wafer deposition product, described above, is suitable for use, generally together with or in place of the single cavity embodiments of the stacked, optically coupled etalon wafers disclosed here.

In accordance with certain embodiments as disclosed above, the etalon wafers described above may be bonded to each other. Each etalon wafer comprises any or all of the components listed above including, but not limited to, a bulk optic wafer, optionally comprising a wedge coating and/or a thickness-adjustment layer, and thin film mirror coatings on the surfaces of the bulk optic wafer. Between adjacent etalon wafers may be a layer of bonding material that acts to optically couple the etalon wafers together. The thickness of the bonding layer is preferably equal to an odd number of QWOTs. This bonding layer may comprise an adhesive, such as an epoxy, e.g. the epoxies available from Epoxy Technology, Billerica, Mass., such as EPO-TEK 353ND, an adhesive optionally having a monolayer of small beads embedded in the adhesive to facilitate precise spacing of the adjacent etalon wafers, fritted glass or any other composition or material that may be deposited to an odd number of QWOTs and is capable of bonding the etalon wafers together.

In accordance with another aspect, a method for production of the stacked, optically coupled etalon wafers is disclosed. Each etalon wafer may comprise the components discussed above, including but not limited to, a bulk optic wafer, optionally comprising a wedge coating and/or a thickness-adjustment layer, and thin film coatings on the surfaces of the bulk optic wafer. In accordance with preferred embodiments, multiple etalon wafers can be formed simultaneously by depositing thin film mirror coatings onto both planar surfaces of a planar wafer formed of silica, or any other suitable optical glass or suitable optical material. Such deposition preferably is by physical vapor deposition, as disclosed above. Optionally, the wafer is first planarized and coated with a wedge coating and/or a thickness-adjustment layer. After a selectively transparent thin film mirror coating is deposited on each side of the wafer, multiple etalon wafers can then be stacked and joined as disclosed above. In preferred embodiments, at least in some overlying areas the wafers are optically matched to each other. Two or more wafers can be stacked and joined in this manner. The stacked wafers may then be cut or diced to provide multiple functional units of stacked, optically coupled etalons. Optionally, prior to dicing the wafer into individual etalons or into intermediate size "coupons" or the like, a bonding or joining material can be deposited onto one or both sides. Preferably such deposition is by sputter deposition, or other physical vapor deposition method, using optical monitoring to achieve proper thickness. Typically, the thickness of the joining or bonding layer will be an odd number (i.e. an odd integer) of QWOTs. In certain preferred embodiments further discussed below, the bonding layer will remain in the light path between adjacent etalon wafers. In such embodiments, the bonding layer is formed of optically transparent material. In certain preferred embodiments, the bonding layer is selectively removed from the light path, e.g., by chemical etching, leaving an annulus or multiple discrete "feet" to serve as stand-offs between adjacent etalon wafers. In such embodiments the material used to form the "feet" need not be optically transparent.

In accordance with certain preferred embodiments, the etalon wafers are joined by depositing an optically transparent fritted glass layer on at least one surface of etalon wafers. The fritted glass is preferably deposited using a vapor deposition process to a controlled thickness. Two or more wafers can be stacked or, alternatively, individual coupons or individual etalons can be stacked after being coated with fritted glass. After being placed in physical contact, the etalon wafers are heated to the melting or softening point of the fritted glass, bonding the stacked etalon wafers together. Preferably, after the etalon wafers are joined, the thickness of the fritted glass layer between them is equal to an odd number of QWOTs. One skilled in the art will recognize, given the benefit of this disclosure, that this process may be repeated using additional etalon wafers to increase the number of etalon wafers that are joined and stacked.

In accordance with certain preferred embodiments, the etalon wafers are joined using "feet." As used herein, "feet" are projections from opposite surfaces of adjacent etalon wafers. "Feet" can be formed of fritted glass or other suitable materials able to provide a structurally stable stacking of the adjacent etalon wafers to each other. After adjacent etalon wafers are positioned in contact, heat can be applied to sufficiently melt or soften the "feet" so as to join the etalon wafers to each other. Preferably, after joining the etalon wafers, the distance between the etalon wafer surfaces is equal to an odd number of QWOTs.

In accordance with certain preferred embodiments, adjacent etalon wafers are joined using a layer of epoxy or other suitable adhesive. The adhesive can be applied using any suitable technique. Two or more wafers are stacked in physical contact after the adhesive is applied. After being placed in physical contact, the adhesive layer bonds the etalon wafers forming stacked, optically coupled etalon wafers. Preferably, after the etalon wafers are joined, the thickness of the epoxy layer is equal to an odd number of QWOTs. One skilled in the art will recognize, given the benefit of this disclosure, that this process may be repeated using additional etalon wafers to increase the number of etalon wafers that are coupled and stacked. In accordance with certain preferred embodiments, the etalon wafers are joined using adhesive comprising optically transparent beads sized to function as a monolayer to assure a controlled spacing between the etalon wafers. Wafers are placed in physical contact after being coated with the bead/adhesive mixture. After being placed in physical contact, the bead/adhesive mixture bonds the etalon wafers forming stacked, optically coupled etalon wafers having a uniform separation. Preferably, after the etalon wafers are joined together, the thickness of the bead/adhesive layer is equal to an odd number of QWOTs. One skilled in the art will recognize, given the benefit of this disclosure, that this process may be repeated using additional etalon wafers to increase the number of etalon wafers that are coupled and stacked.

In accordance with preferred embodiments, the etalon wafers may be coupled together using optical contact. To accomplish optical contact bonding, adjacent etalon wafers are placed in physical contact with each other. Etalon wafers are prepared as described above. The etalon wafers are then placed into physical contact and, while not wishing to be bound by theory, it is presently understood that adjacent etalon wafers in optical contact with each other are held together by electrostatic forces between the contacting surfaces of the etalon wafers. Therefore, after optical contacting adjacent etalon wafers there is approximately near zero thickness between the adjacent etalon wafers, e.g. near zero QWOTs. For certain preferred embodiments, the selectively transparent thin film mirror coatings of the stacked etalon wafers are formed of alternating films of high refractive index material and low refractive index material. Preferably, the outermost film of the mirror coating of one etalon wafer is the same (i.e., either low or more preferably high refractive index) as the outermost film of the mirror coating of the adjacent etalon wafer. The transition layer between them preferably has the opposite refractive index. Thus, if the two outermost films facing each other are high refractive index, then an air spacer or other low refractive index material preferably fills the odd QWOT space between the two etalon wafers. Likewise, if the mirror coatings finish with low refractive index materials, then the joining transition layer between the two etalon wafers should have a high refractive index.

Alternatively, the thickness of the outermost layer of the thin films may be reduced such that, when combined together they form a joining transition layer of refractive index opposite to that of the next film on either side. In other preferred embodiments, the etalon wafers may be held in a stacked position using a coupling member such as a metal jacket a sleeve, etc. Should a coupling member be used, any space that exists between the etalon wafer surfaces is preferably equal to an odd number of QWOTs and may be filled with air or other suitable materials.

In accordance with another aspect, the diced coupons or individual components of the stacked and optically coupled etalon wafers disclosed here may be incorporated into optical systems. The stacked, optically coupled etalon wafers, or diced components as the case may be, can be directly optically coupled, as the term is used here, when they are optically coupled, i.e. are in the same optical path, and furthermore are in optical contact or are otherwise in physical contact with each other and/or mounted to each other (e.g. by bonding material in or out of the optical path) or mounted together in the same housing or by the same fixture. An air space may be separating the stacked, optically coupled etalon wafers, or the stacked, optically coupled etalon wafers may be in direct surface-to-surface contact. Similarly, optical components in an optical system comprising the stacked, optically coupled etalon wafers, or the diced components, disclosed here, that are directly optically coupled in accordance with the present disclosure, preferably have no intervening optical components performing substantial channel filtering or like optical operation on any passed signals. In particular, any signals passed by the stacked, optically coupled etalon wafers, or diced components, or other optical components in the optical system, arrive at a second etalon wafer or second stacked, optically coupled etalon wafer (or diced components), or other optical component, without any intervening wavelength filtering optical operations to add or drop passbands or like operations. One skilled in the art, given the benefit of this disclosure, will be able to design and assemble optical system comprising directly optically coupled and stacked, optically coupled etalon wafers, and the diced components thereof, and other optical components described here.

In accordance with another aspect, additional optical elements, or a field or array of other optical elements, may be incorporated, e.g. stacked and optically coupled, into the optical element wafers. Such optical elements include additional etalons or etalon wafers, collimators, fibers, receivers, receiving sockets so as to create in the resulting stacked products fiber pigtails incorporated therein, etc. Suitable collimators may be formed comprising a size suitable for an intended x-y dimension of the stacked and optically coupled etalon units to be diced from the stacked and optically coupled etalon wafers. Such collimators may be formed by etching of the wafer, using MEMS techniques and the like, or other suitable techniques known to those skilled in the art. A wafer comprising a formed collimator may be coupled to adjacent etalon wafers, or the etalon wafers may be stacked and optically coupled prior to forming a collimator in the optical element wafer. Optical systems may be designed using the wafers, or diced components thereof, comprising the collimators formed thereon. One skilled in the art, given the benefit of this disclosure, will be able to select other suitable optical elements, for incorporating into the optical element wafers, for an intended use of the optical element wafers.

Optical elements comprising stacked, optically coupled etalon wafers (and/or diced components thereof) as disclosed above and the methods disclosed for their production will be recognized by those skilled in the art to represent a significant technological advance. Robust stacked, optically coupled etalon wafers can be produced meeting precise optical performance characteristics, with advantageously low production costs and good production flexibility. In preferred embodiments, the stacked, optically coupled etalon wafers have the advantageous attributes of small size, simple and potentially inexpensive construction, and good optical performance, including low loss, low polarization dependent loss and polarization mode dispersion, and low chromatic dispersion. Additional features and advantages will be understood from the following detailed description of certain preferred embodiments.

BRIEF DESCRIPTION OF FIGURES

Certain preferred embodiments of the invention will be described below with reference to the attached drawings in which:

FIGS. 3a and 3b is an apparatus suitable for deposition of a wedge coating onto a bulk optic wafer;

Figure 1A:
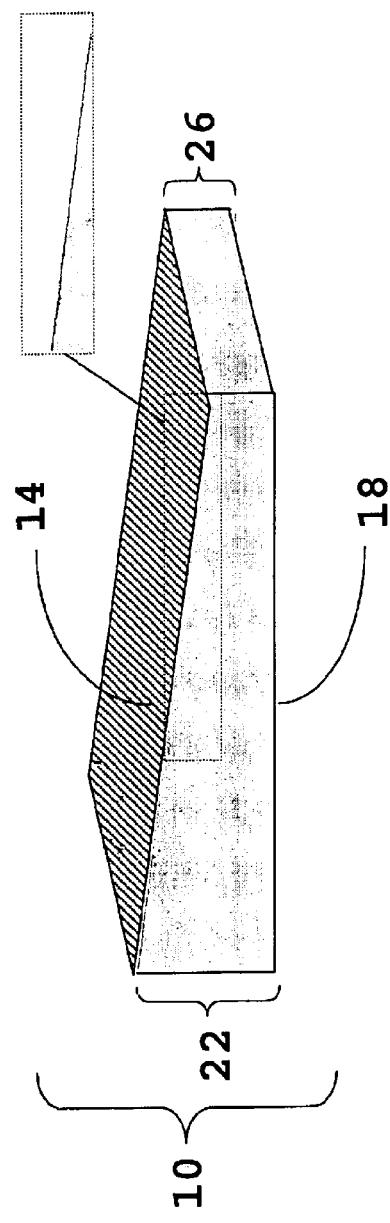
FIGS. 1a and 1b are several embodiments of a bulk optic wafer.
Figure 1B:
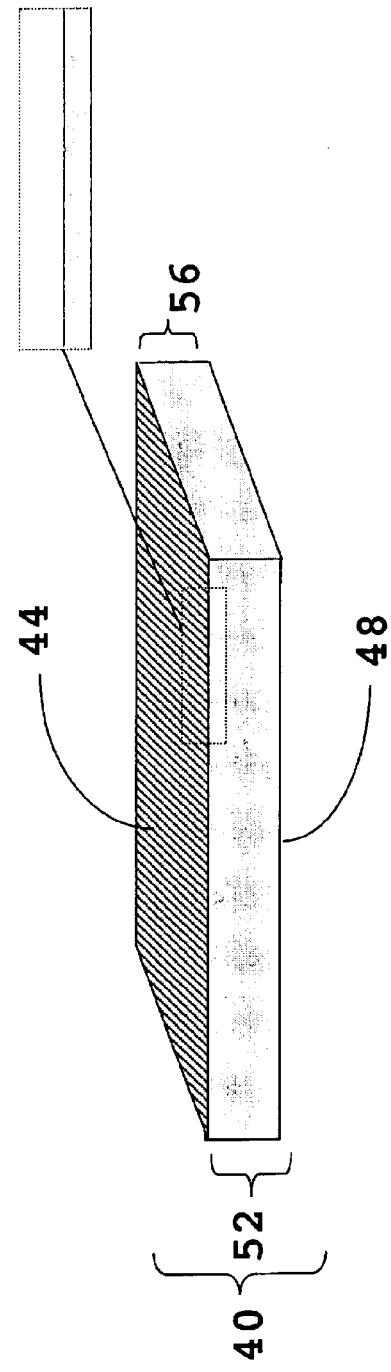

It will be apparent that the bulk optic wafers and optical element wafers shown in FIGS. 1–10 are not necessarily to scale. Certain dimensions, such as the thickness of thin film coatings, may have been enlarged relative to other dimensions, such as the thickness of the bulk optic wafer, for clarity of illustration and ease of understanding. Directional references used in this disclosure and detailed description, and in the claims, refer to the orientation shown in FIG. 1 unless otherwise clear from context. It will be understood by those skilled in the art, that the devices disclosed here can be used generally in any orientation relative to gravity and/or other components to which they might be optically and/or physically coupled, e.g., by optical fiber or the like.

DETAILED DESCRIPTION OF CERTAIN PREFERRED EMBODIMENTS

It will be recognized from the above, that the novel optical element wafers disclosed here can be formed in innumerable different configurations and sizes. The precise size and configuration of the optical element wafers, including the dimensions of the wafers, the choice of materials, design of the Fabry-Perot thin films, cavity spacing and the like will depend in large part on the particular application and use environment for which it is intended and its desired optical properties and performance characteristics. For convenience in this more detailed description of certain preferred embodiments, the diced components, either coupons or individual components, of the optical element wafers will generally be of a type suitable for use in optical elements of a fiber optic telecommunication system. It will be within the ability of those skilled in the art, however, given the benefit of this disclosure, to select suitable materials and designs, as well as manufacturing techniques, for production of optical element wafers in accordance with the principles of the present invention, suitable for these and other types of applications.

Certain preferred embodiments of the stacked, optically coupled etalon wafers disclosed here comprise first and second Fabry-Perot thin film coatings on parallel opposite sides of a cavity formed by a bulk optic wafer comprising a solid, optically transparent body and a wedge coating on a surface of the optically transparent body. The wedge coating underlies the first Fabry-Perot coating and the axial dimension of the bulk optic wafer, i.e., the dimension of the bulk optic wafer (with the wedge coating and any thickness-adjustment layer) in the direction of light passage, defines the cavity spacing of an etalon wafer. As used here, in certain instances as will be clear from context, the term "bulk optic wafer" refers to a component of the etalon wafers disclosed above comprising a solid, optically transparent body, such as an optically transparent substrate wafer, together with the wedge coating and/or a thickness-adjustment layer. The solid, optically transparent body is an optically transparent substrate having first and second generally flat surfaces on opposite sides, which is self-supporting in the sense that it does not require an underlying support member to retain its shape and integrity during handling, packaging and transport in manners typical for optical elements intended for use as sensors, fiber optic communication system components or the like. Most preferably the transparent body of the bulk optic wafer is a monolithic body, that is, a one-piece, unitary, self-supporting body of material. The wedge coating overlies a surface of the transparent body of the bulk optic wafer, and there may or may not be a visible or discernable seam or interface between them. In certain preferred embodiments the wedge coating and optional thickness adjustment layer are formed of material that is the same as that of the optically transparent body. In other preferred embodiments, the wedge coating and/or thickness-adjustment layer are formed of a material comprising substantially the same refractive index as the material comprising the optically transparent body, e.g. the refractive indices differ by less than about ±0.01. It may, therefore, be difficult or impossible to see the boundaries between the bulk optic wafer, the wedge-correction layer and the thickness-adjustment layer. It is, of course, desirable generally that there be no or substantially no optical effect at such boundaries which would adversely impact the performance of the etalon wafer or the stacked and optically coupled etalon wafers. Thus, the wedge coating and thickness-adjustment coating may be difficult or even impossible to distinguish from the material of the underlying optically transparent body, at least without observing the manner in which the etalon wafer was produced. This typically will not be the case where different materials are used for the optically transparent body, wedge coating and thickness-adjustment coating. In any event, these components of the bulk optic wafer are distinct from each other in the function they perform and in their position in the bulk optic wafer.

As discussed further below, the bulk optic wafer preferably is a substantially planar substrate, e.g., a glass, indium phosphide, silica or silicon wafer. Other suitable materials and glasses will be apparent to those skilled in the art given the benefit of this disclosure. In preferred embodiments, the wafer has a diameter of about 0.5 to 8 inches and a thickness between the first and second surfaces of about 0.2 to 2 mm. After the wafer has received the wedge coating, thickness-adjustment layer and Fabry-Perot thin film coatings by physical vapor deposition, preferably sputter deposition, and after the coated wafers have been coupled to form stacked, optically coupled etalon wafers, dicing of the optical element wafers into coupons or individual optical elements can occur. Prior to dicing the optical element wafer into optical elements, additional treatment steps, e.g. heating, tuning, testing, etc., optionally can be performed on the optical element wafers. Thus, in these preferred embodiments the substrate piece forming the body of individual stacked, optically coupled etalons is diced from coupled larger bodies each sufficiently self-supporting as to be suitable for mounting (with and without spinning) in a vacuum deposition chamber for depositing optically functional coatings or film stacks on one or both sides. The bulk optic wafer component of the stacked, optically coupled etalon wafers disclosed here is often 4–12 inches in diameter or larger. Thus numerous individual stacked, optically coupled etalons can be obtained from each stacked, optically coupled etalon wafer.

In accordance with preferred embodiments, a rectangular bulk optic wafer 10 is seen to comprise first and second, non-parallel surfaces 14 and 18 respectively (see FIG. 1a). That is, a wedge exists so that cavity spacing at side 22 of the wafer is greater than cavity spacing at side 26 of the wafer. To achieve substantially parallel surfaces, a wedge coating may be deposited onto one or more surfaces of the bulk optic wafer, or one or more surfaces of the bulk optic wafer may be preferentially chemically etched. The result of either process is that a bulk optic wafer 40 having substantially parallel surfaces 46 and 48, preferably parallel to less than 0.01 arc second, is formed (see FIG. 1b). That is, after deposition of wedge coating or PCE, cavity spacing at sides 52 and 56 are approximately equal, as is the cavity spacing across the entire axial dimension, e.g. the direction of the optical path, of the bulk optic wafer 40. Such bulk optic wafers having substantially parallel surfaces are suitable for use in forming stacked, optically coupled etalon wafers after deposition of thin film coatings on a surface of the bulk optic wafer. One skilled in the art, given the benefit of this disclosure, will recognize that the size, shapes, thickness, and geometries of the bulk optic wafer may vary depending on the intended use of the resulting optical element wafers, or diced components thereof.

Figure 2:
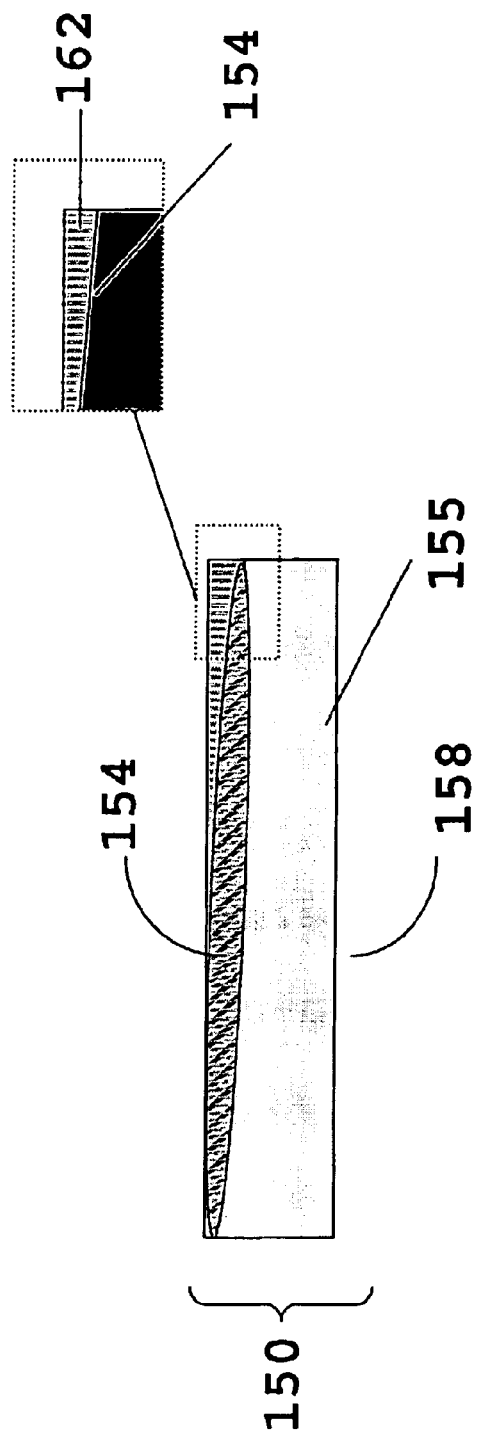
FIG. 2 is an embodiment of a bulk optic wafer comprising a wedge coating.

In accordance with preferred embodiments, a wedge coating 162 may be deposited on one or more surfaces 154 and 158 of a bulk optic wafer 150 (see FIG. 2). The bulk optic wafer 150 comprises a solid optically transparent body 155 underlying the wedge coating 162. The axial dimension of the bulk optic wafer, i.e. the dimension of the bulk optic in the direction of light passage, defines the cavity spacing of the etalon wafer. The precise optical thickness of the bulk optic wafer will be adjusted slightly to compensate for the non-zero thickness of the metal films to preserve or optimize transparency at the precise wavelength(s) of interest. The optically transparent body 155 preferably is a monolithic body formed of silica or other suitable optical grade glass. The wedge coating 162 preferably is a layer of silica, most preferably being formed of the same material as the optically transparent body 155. In preferred embodiments the wedge coating comprises a material having approximately the same refractive index as the material comprising the optically transparent body of the bulk optic wafer, e.g. the difference in refractive index of the materials is preferably less than about ±0.01. Other suitable materials will be readily apparent to those skilled in the art given the benefit of this disclosure.

The wedge coating can be seen in FIG. 2 to have a progressively increasing axial dimension from right to left in the cross-sectional view of FIG. 2. In a typical embodiment, the cross-sectional view obtained by cutting in a plane perpendicular to the plane of the paper in FIG. 2 would show a substantially constant axial dimension for the wedge layer. The combined thickness of wedge coating 162 and optically transparent body 155 is substantially constant over at least a large area of the bulk optic wafer. Such parallelism is achieved in accordance with preferred embodiments through a combination of substrate polishing and the wedge coating. An optical wafer suitable for mounting in a sputtering chamber is subjected to a polishing process in accordance with known techniques and commercially available equipment. Such polishing processes typically produce finished substrates to within 2 arc seconds, preferably 1 to 2 arc seconds of wedge (shown exaggerated in FIG. 1a) and a wavefront error of less than $\frac{1}{50}$ of a wave at 1550 nm. Low wavefront error will be understood in this context to mean that the thickness variation across the substrate is controlled by (i.e., essentially due to) the wedge. A wedge coating is then formed on one or both surfaces of the substrate to compensate for, that is, to offset, the wedge; net wedge after the wedge coating can be reduced to less than 0.1 arc second, less than 0.01 in preferred embodiments. The wedge coating can be formed by physical vapor deposition technique, such as magnetron sputtering or other sputtering method. Preferably the wedge coating is deposited on the optically transparent body of the wafer by sputter deposition from a source in a vacuum chamber, the optically transparent body being mounted within the vacuum chamber without spinning during deposition and asymmetrical to the source. That is, in accordance with certain preferred embodiment, the substrate wafer is mounted in the vacuum chamber with no spinning and offset at an angle to the target or source. The thinner portion of the substrate is placed closest to the target to receive the highest rate of deposition. The thickest portion is furthest from the target. In preferred embodiments, the wedge coating is deposited so that the thickness of the wedge coating at its thickest point is less than 1 micron and more preferably less than 100 nm. Alternatively or in addition, shielding or other techniques can be used to achieve differential deposition rate across the substrate wafer. It will be within the ability of those skilled in the art to determine the proper distance and angle of offset to obtain good yield of wafer surface area having substantially uniform thickness. In that regard, substantially uniform, as that term is used here, means that the thickness of the wafer, including the bulk optic plus the wedge-correction layer, is sufficiently uniform over an area the size of a chip or segment to be cut later from the wafer, most preferably a large number of such chips or segments, to provide satisfactory optical precision in stacked, optically coupled etalon wafers. Similarly, the precision of the thickness of the bulk optic wafer must be sufficient to provide satisfactory optical precision in the functioning of the stacked, optically coupled etalon wafers.

It will be within the ability of those skilled in the art to select or empirically determine suitable orientations and positions of the substrate within a deposition chamber to achieve suitable deposition of wedge coating onto the substrate. Referring to FIGS. 3a and 3b, an embodiment of a chamber suitable for depositing a wedge coating onto a wafer or substrate is shown. The chamber 170 comprises an elongate source or target 172, e.g. a rectangular source, and a substrate 174, such as an optically transparent substrate wafer, for receiving a wedge coating, which is held in place by device 176. In preferred embodiments, the length β of target 172 is about three-four times larger than the diameter γ, or other length as the case may be, of the substrate 174. Target 172 may be positioned at distances α and δ from substrate 174. One skilled in the art, given the benefit of this disclosure, will be able to select or empirically determine dimensions for α and δ to achieve suitable deposition of wedge coating onto the substrate. The wedge coating is typically deposited without spinning the substrate 174, and substrate 174 is positioned in the chamber so that the thinner portion of the substrate is placed closest to target 172 to receive the highest rate of deposition.

Total coating thickness to substantially eliminate a 1 arc second wedge is typically about 4–8 quarter waves (of the intended light wavelength that the etalon will be used with) at the thickest point. Preferably the coating is controlled by optical monitoring, most preferably monitoring of two points on the wafer substrate during deposition. Coating can be halted when the thickness is the same at the two points along the direction of wedge. It should be noted that for clarity of explanation, the optically transparent body is still treated here as having its original wedge; the bulk optic wafer comprising both that body and the wedge layer has a substantially constant net thickness.

Figure 4:
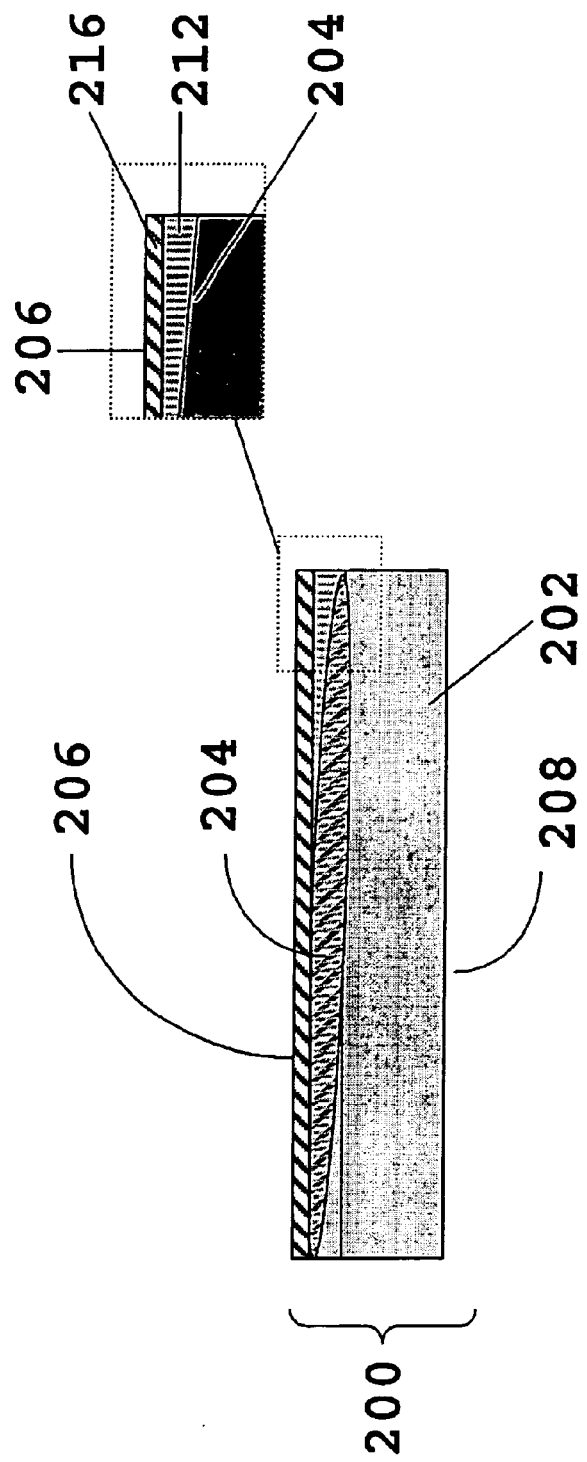
FIG. 4 is an embodiment of a bulk optic wafer comprising a wedge coating and a thickness adjustment layer.

Referring now to FIG. 4, an embodiment of a bulk optic wafer 200 is seen to comprise a wedge coating 212 and a thickness adjustment layer 216 on surface 204 of the optically transparent body 202. After deposition of wedge coating 212 and thickness adjustment layer 216, surfaces 206 and 208 are substantially parallel. The bulk optic wafer of FIG. 4 comprises a thickness-adjustment layer 216 of substantially uniform thickness. Such layers may be, e.g. 0–100 microns, typically being between 1 and 10 microns thick, preferably less than about 5 microns thick, for example about 2 microns thick. Optical monitoring, as described above, can be used to control deposition of the thickness-adjustment layer. The deposition is controlled such that total thickness achieved the half wave condition for the bulk optic wafer, which corresponds to the wavelength at which the etalon wafer is to be resonant. The thickness-adjustment layer can be formed by physical vapor deposition technique, such as magnetron sputtering or other sputtering method. Preferably the thickness adjustment layer is deposited on the optically transparent body, comprising a wedge coating, by sputter deposition from a source in a vacuum chamber, the optically transparent body being mounted within the vacuum chamber and spinning during deposition and asymmetrical to the source. The precision of the thickness of the bulk optic wafer with the thickness-adjustment layer added during thickness correction must be sufficient to provide satisfactory optical precision in the functioning of an etalon wafer and the stacked, optically coupled etalon wafers.

Figure 5:
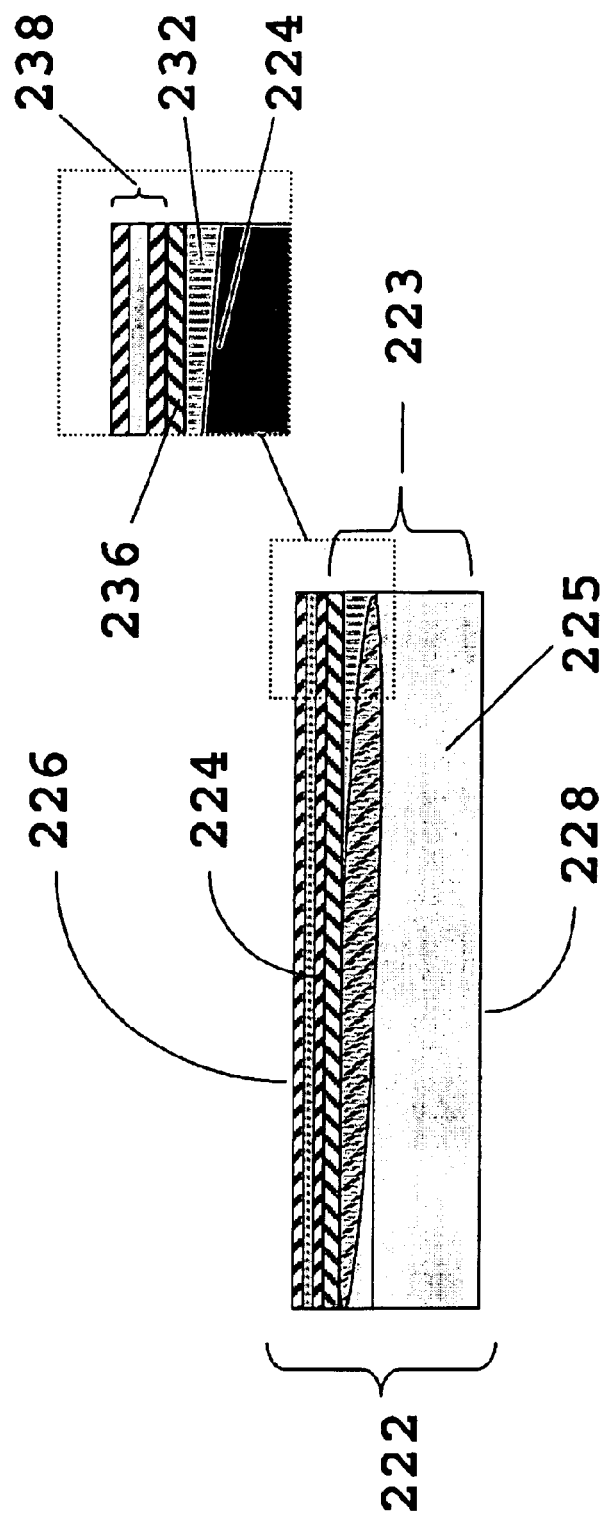
FIG. 5 is an embodiment of a bulk optic wafer comprising a wedge coating, thickness-adjustment layer, and thin film coatings.

In accordance with preferred embodiments, FIG. 5 is an embodiment of an etalon wafer 222 comprising a first thin film coating 238 on surface 224 of bulk optic wafer 223 which forms the etalon wafer's cavity. Second thin film (not shown) is deposited on parallel opposite surface 228 of the bulk optic wafer. The bulk optic wafer 223 comprises a solid, optically transparent body 225, wedge coating 232 overlying the optically transparent body 225, and thickness-adjustment layer 236 sandwiched between the wedge coating 232 and the thin film coating 238. The axial dimension of the bulk optic wafer, i.e., the dimension of the bulk optic in the direction of light passage, defines the cavity spacing of the etalon wafer. The optically transparent body 225 of the bulk optic wafer preferably is a monolithic body as described above. Materials suitable for the optically transparent body, wedge coating and thickness-adjustment layer include those discussed above. The Fabry-Perot thin film mirror coatings in the embodiment of FIG. 5 are dielectric film stacks of alternating high and low index of refraction. That is, the two thin film mirror coatings are formed of alternating sputtering-deposited layers of low refractive index material and high refractive index material, often referred to as H/L/H film stacks. For representative purposes, the thin film coatings are shown as having three films in its film stack; typically, as is well known to those skilled in the art, film stacks comprising many more alternating films may be used to achieve desired optical performance characteristics. Typically, the first and second thin film coatings will have substantially identical film stacks. Selecting a suitable number of alternating layers and suitable film materials will be within the ability of those skilled in the art given the benefit of this disclosure. In preferred embodiments, the thin film coatings are continuous uniform thickness metal films. Preferably the film stacks are deposited by reactive magnetron sputtering, ion beam sputtering or other suitable technique, a number of which will be readily apparent to those skilled in the art given the benefit of this disclosure. Exemplary dielectric materials for the high refractive index layers of the film stack include $Ta_2O_5$, $ZrO_2$, $TiO_2$, and $Al_2O_5$. Exemplary dielectric materials for the low refractive index layers of the film stack include $SiO_2$, MgF, etc. Additional suitable materials will be readily apparent to those skilled in the art given the benefit of this disclosure.

Figure 6:
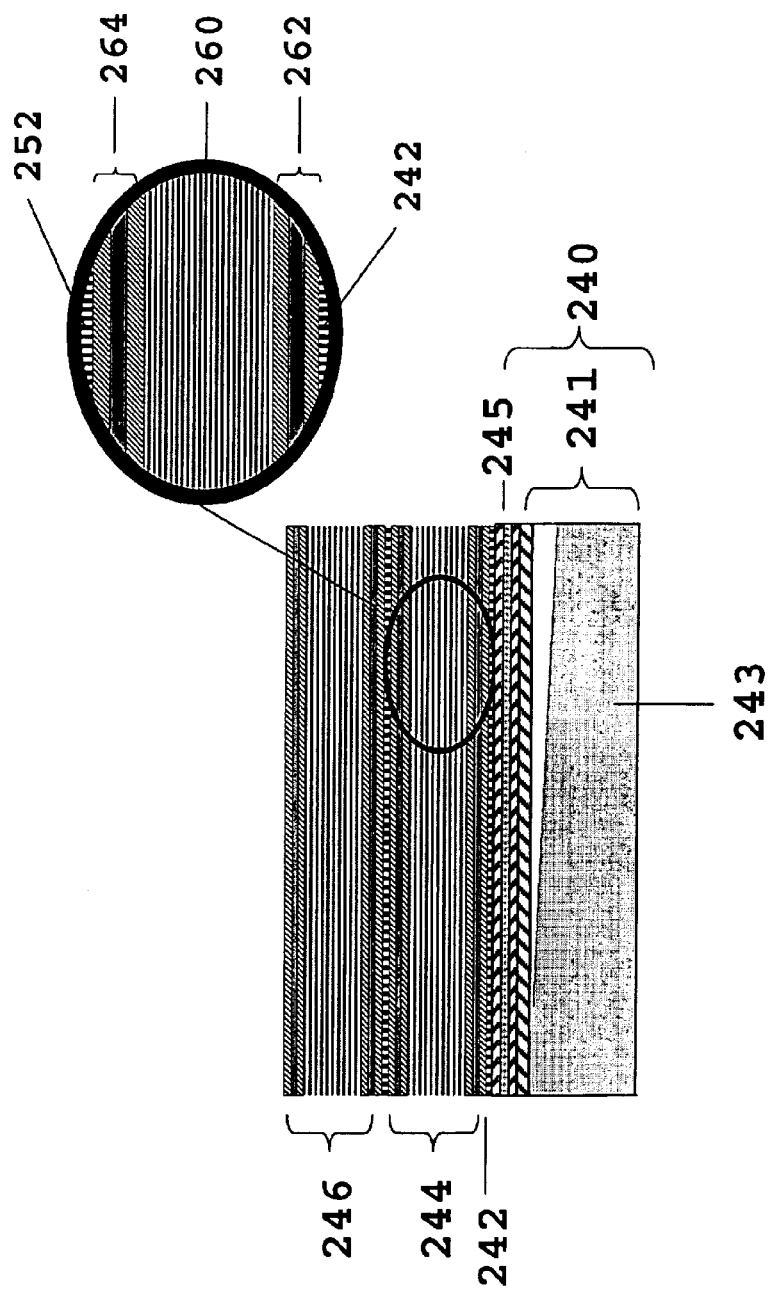
FIG. 6 is an embodiment of a bulk optic etalon wafer comprising a thin film etalon cavity.

In accordance with preferred embodiments, an embodiment of a multi-cavity etalon comprising an etalon wafer 240, which comprises bulk optic wafer 241, Fabry-Perot thin film coatings on opposite surfaces of the bulk optic wafer, and transition layers 242 and 252, and thin film etalons 244 and 246 is shown in FIG. 6. Typically the thin film etalons 244 and 246 are not optically matched with the bulk optic etalon wafer but instead may be optically mismatched, e.g. the thin film etalon and the bulk optic etalon wafer have a single common passband. Bulk optic wafer 241 comprises an optically transparent body 243 and optionally a wedge coating and thickness adjustment layer. On each side of the bulk optic wafer 241 are thin film mirror coatings, such as those discussed above. After deposition of the thin film mirror coatings onto the surfaces of the bulk optic wafer, cavity films may be deposited onto thin film coatings. Prior to deposition of the thin film coatings and cavity films of the thin film etalon, a first transition layer 242 is deposited using sputtering or other suitable techniques, e.g. ion beam sputtering, magnetron sputtering, etc. The first transition layer 242 is in direct surface-to-surface contact with thin film stack 245. Thin film coating 262, such as an H/L/H thin film stack for example, may be deposited onto transition layer 242. After deposition of thin film coating 262, a cavity film 260 may be deposited onto thin film coating 262. After deposition of the cavity film 260, second thin film coating 264 may be deposited onto cavity film 260. Therefore, a thin film etalon typically comprises a first thin film coating or stack, the cavity film, and a second thin film coating or stack. A second transition layer 252 may be deposited onto first thin film etalon 244, and the process just described may be repeated to provide deposition of additional thin film etalons, such as thin film etalon 246. In preferred embodiments, the thickness of the transition layer typically is an odd integer number (e.g. 1, 3, 5, 7 . . . ) of quarter wavelengths optical thickness (QWOTs). Typically the cavity film of the additional thin film etalons is deposited to a half-wave condition or an integral number of half waves. For example, in certain embodiments, the thickness of the cavity film can be from 1 to 10 half waves corresponding to about 0.5 to 5 microns for silica cavity film in an etalon operative in the C-band. The thickness of the thin film coatings, of the thin film etalons, is preferably equal to an integral number of half waves.

Figure 7:
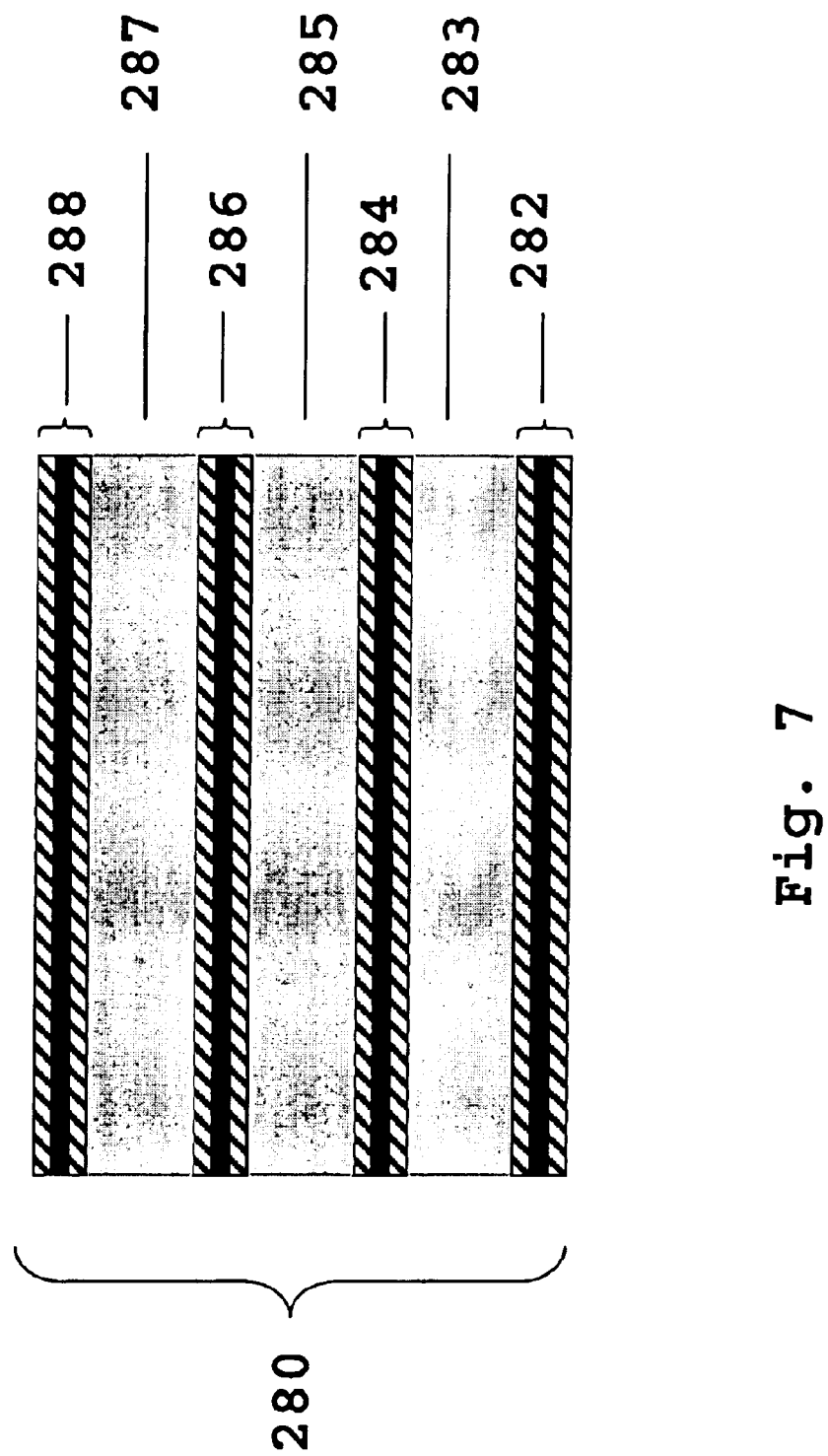
FIG. 7 is an embodiment of stacked, optically coupled etalon wafers in optical contact.

Referring now to FIG. 7, an embodiment of stacked, optically coupled etalon wafers is shown. One skilled in the art, given the benefit of this disclosure, will be able to assemble stacked, optically coupled etalon wafers comprising the etalon wafers and the multi-cavity etalon wafers described above. For convenience sake and for clarity, however, the etalon wafers in the stacked, optically coupled etalon wafers shown and described here comprise the components of the etalon wafer shown in FIG. 5. Referring to FIG. 7, the stacked optically coupled etalon wafers 280 comprises bulk optic wafers 283, 285, and 287 joined using optical contact. Without wishing to be bound by theory, it is currently understood that when placed into optical contact, electrostatic forces hold the etalon wafers together. Optionally, a coupling member may be used to maintain the optical contact. This coupling member may be any device capable of maintaining the etalon wafers in position in the stack, e.g. a rigid jacket, a sleeve, etc. Between bulk optic wafers 283, 285 and 287 are thin film coatings 284 and 286. On the outer surfaces of the terminal bulk optic wafers 283 and 287 are thin film coatings 282 and 288, respectively. Each bulk optic wafer may also comprise a thickness adjustment layer (not shown) and a wedge coating (not shown) underlying the thin film coatings. The number of coupled etalon wafers is not limited to the number shown and described here. One skilled in the art, given the benefit of this disclosure, will recognize that a plurality of etalon wafers may be coupled together by addition of more thin film coatings and more bulk optic wafers. For example, additional etalon wafers may be joined to the stack of optically coupled etalon wafers described here, e.g. by stacking additional etalon wafers on thin film coating 288 and/or thin film coating 282. After optical contacting of the etalon wafers, the stacked, optically coupled etalon wafers can be diced into coupons or into individual stacked, optically coupled etalons.

Figure 8:
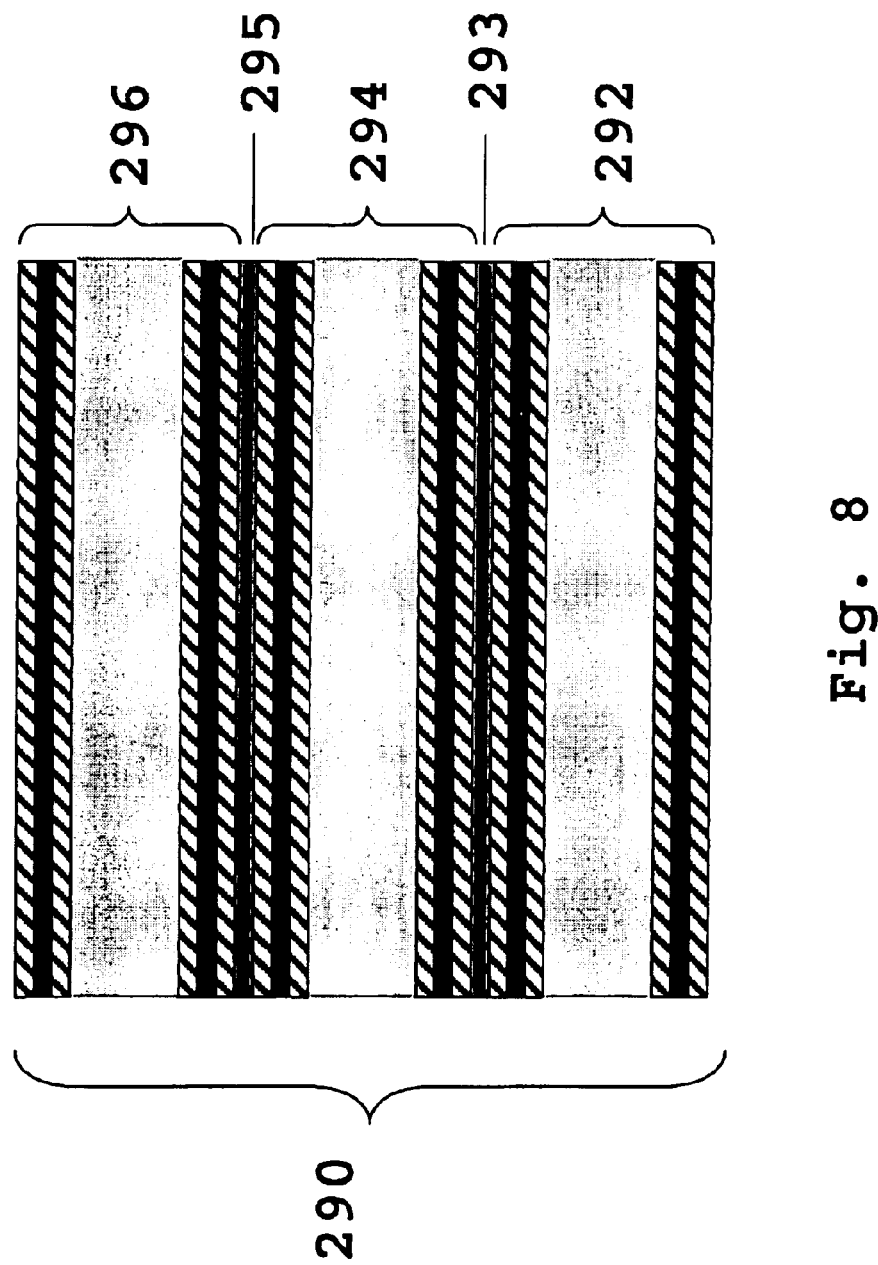
FIG. 8 is an embodiment of stacked, optically coupled etalon wafers joined using a bonding layer.

In accordance with preferred embodiments, FIG. 8 is another embodiment of stacked, optically coupled etalon wafers. The stacked, optically coupled etalon wafers 290 comprises bulk optic etalon wafers 292, 294, and 296 joined using optically transparent bonding layers 293 and 295. In preferred embodiments, the bonding layer comprises a material that is deposited to a thickness equal to an odd number of QWOTs after the etalon wafers are joined together. In certain embodiments, fritted glass is used to join the etalon wafers together. The fritted glass is preferably deposited using a vapor deposition process or a sputter deposition process. The fritted glass may be deposited on both surfaces of an etalon wafer. Alternatively, the fritted glass may only be deposited on one surface of an etalon wafer. The fritted glass is deposited so that the thickness of the fritted glass is equal to an odd number of QWOTs when the etalon wafers are joined together. After deposition of the fritted glass on the etalon wafers, the fritted glass can be heated to melt or soften the fritted glass. Placement of the etalon wafers in contact and resolidification of the fritted glass results in joining of the etalon wafers. One skilled in the art will recognize that materials with similar properties and characteristics as fritted glass may be used to join the etalon wafers together. In certain embodiments, a portion of the fritted glass is etched away to leave "feet" or projections on the surfaces of the etalon wafers. The "feet" may be treated similar to the fritted glass to join the etalon wafers together. In other embodiments, the bonding material comprises an epoxy or other adhesive or small beads in an adhesive mixture. In preferred embodiments, the small bead/adhesive mixture is deposited to form a monolayer of beads after the etalon wafers are joined together. The uniform size of the beads provides for uniform spacing between adjacent coupled wafers. In other preferred embodiments, the bonding material comprises EPO-TEK 353ND or other similar materials. Each bulk optic etalon wafer may also comprise a thickness adjustment layer (not shown) and a wedge coating (not shown) underlying the thin film coatings. Additional etalon wafers may be joined to the stack of optically coupled etalon wafers described here, e.g. by depositing additional bonding layers and joining additional etalon wafers. The number of coupled etalon wafers is not limited to the number shown and described here. One skilled in the art, given the benefit of this disclosure, will recognize that a plurality of etalon wafers may be coupled together by addition of more bonding layers and more bulk optic etalon wafers. After coupling of the etalon wafers, the stacked, optically coupled etalon wafers can be diced into coupons or into individual stacked, optically coupled etalons.

In accordance with certain preferred embodiments, methods are provided of making an etalon wafer, suitable for use in the stacked, optically coupled etalon wafers, as disclosed above. Such methods comprise the step of polishing at least one surface of an optically transparent wafer to produce an optically transparent body having opposite sides parallel preferably to within 5 arc seconds, more preferably to within 2.0 arc seconds. As discussed above, typical commercial processes do not reliably give adequate thickness and/or parallelism for good yield of etalon wafers intended for use in the stacked, optically coupled etalon wafers. The methods further comprise depositing an optically transparent wedge coating on at least one of the opposite sides of the optically transparent body to produce a bulk optic wafer having opposite sides parallel to within less than about 0.4 arc seconds, more preferably less than about 0.2 arc seconds, most preferably, for higher performance etalons, less than 0.1 arc second. Continual two-spot optical monitoring can be used to control deposition of the wedge coating as disclosed above. Reference here to "continually" monitoring thickness during deposition should be understood to meaning optionally, but not necessarily, monitoring continuously, and optionally monitoring regularly or repeatedly during the deposition. In other embodiments, the wedge coating may be omitted and preferential chemical etching can be used to render the surfaces of the bulk optic wafer parallel.

The methods further comprise depositing a first selectively transparent thin film mirror coating on a first one of the opposite sides of the bulk optic wafer and depositing a second such thin film coating on a second one of the opposite sides of the bulk optic wafer to produce an etalon wafer wherein the thickness of the bulk optic wafer defines the cavity spacing of the etalon wafer. For example, referring to FIGS. 9*a* and 9*b*, thin film coating 304 is deposited onto one surface of a bulk optic wafer 300. The bulk optic wafer 300 may comprise a wedge coating and a thickness-adjustment layer underlying the thin film coating 304. On the second surface of the bulk optic wafer, a second thin film coating (not shown) is deposited. The resulting bulk optic etalon wafer 302 (see FIG. 10b) is suitable for use in stacked, optically coupled etalon wafers.

In accordance with certain preferred embodiments of the method described immediately above, approximately one-half of the total thickness of the desired wedge coating is deposited by sputter deposition, without rotation, onto a first side of an optically transparent substrate wafer. The substrate and wedge coating may, for example, both be $SiO_2$. The first Fabry-Perot thin film coating is deposited over such wedge layer. The second one-half of the total thickness of the desired wedge coating then is deposited by sputter deposition, without rotation, onto the second side of the optically transparent substrate wafer. Further, deposition then continues with the substrate spinning until sufficient thickness is coated onto this second side to reach the desired total thickness, stopping deposition at a half wave condition. In accordance with certain preferred embodiments, the thickness-adjustment layer has a substantially uniform thickness between one and five microns. The second Fabry-Perot thin film coating is deposited over the wedge/thickness adjustment layer. In accordance with certain preferred embodiments, the first Fabry-Perot thin film coating and the second Fabry-Perot thin film coating are substantially identical and substantially optically transparent to at least one wavelength for which the etalon wafer is resonant. Preferably, the transparent substrate wafer is a wafer having a diameter greater than 3 inches and a thickness dependent on the intended optical properties. For production of optical bandpass filters, for example, having a bandpass every 200 GHz, for use in an optical communication system in the C-band, a wafer having a thickness of about 0.5 mm is suitable, with a finished thickness of about 0.5 mm for the etalon wafer cavity after deposition of the wedge coating and thickness-adjustment layer.

In accordance with preferred embodiments, after deposition of the thin film stacks overlying the bulk optic wafer, transition layers and thin film etalons can be deposited prior to removal of the etalon wafer from the deposition apparatus, e.g. the thin film etalon may be deposited continuously after deposition of the wedge coating, thickness-adjustment layer, and thin film mirror coatings of the bulk optic etalon wafer. That is, transition layers and thin film etalons may be deposited in a continuous manner after assembly of the bulk optic etalon wafer. A first transition layer comprising materials similar to the bulk optic wafer, wedge coating, and thickness-adjustment layer, such as silica for example, may be deposited onto the thin film stacks of the bulk optic etalon wafer. After depositing a first transition layer, first thin film coating, such as an H/L/H thin film stack for example, may be deposited, in accordance with the methods and embodiments discussed above. A cavity film may subsequently be deposited onto the thin film coating overlying the first transition layer. The cavity film may comprise any suitable material known to those skilled in the art including but not limited to those materials disclosed above that comprise the bulk optic etalon wafer. After deposition of the cavity film, second thin film coating, such as an H/L/H thin film stack for example, may be deposited onto the cavity film. Prior to deposition of additional thin film etalons, transition layers may be deposited to separate the multiple thin film etalons. One skilled in the art, given the benefit of this disclosure, will be able to deposit additional transition layers and thin film etalons suitable for use in optical systems and optical sensors, such as those used in the telecommunications industry.

For stacked, optically coupled etalon wafers, and diced components thereof, intended for the same application but having a bandpass every 100 GHz, a substrate wafer having a thickness of about 1.0 mm is suitable. For e stacked, optically coupled etalon wafers, and diced components thereof, intended for the same application but having a bandpass every 50 GHz, a wafer having a thickness of about 2.0 mm is suitable. In general it will be within the ability of those skilled in the art, given the benefit of this disclosure, to select substrate wafers of suitable thickness for forming the bulk optic cavity of the optical element wafers disclosed here. Similarly, it will be within the ability of those skilled in the art, given the benefit of this disclosure, to deposit wedge coatings and thickness-adjustment layers of suitable thickness on such substrate to produce etalon wafers and stacked, optically coupled etalon wafers having optical thickness proper for the intended application of the optical element.

Figure 9A:
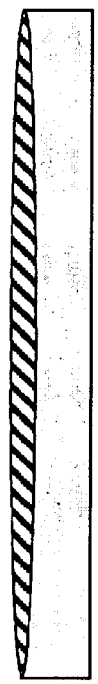
FIGS. 9a–9d is a sequential process of an embodiment for producing stacked, optically coupled etalon wafers.
Figure 9B:
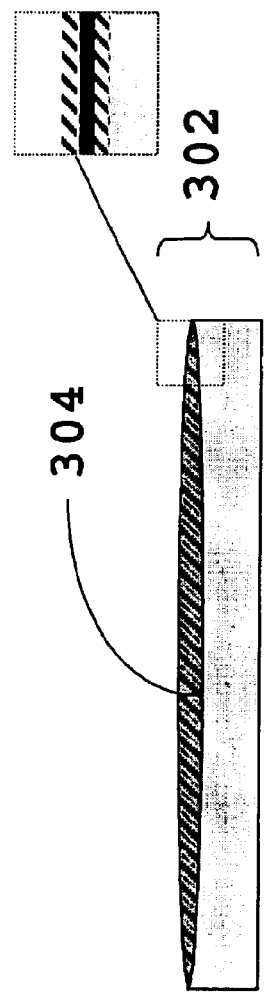
Figure 9C:
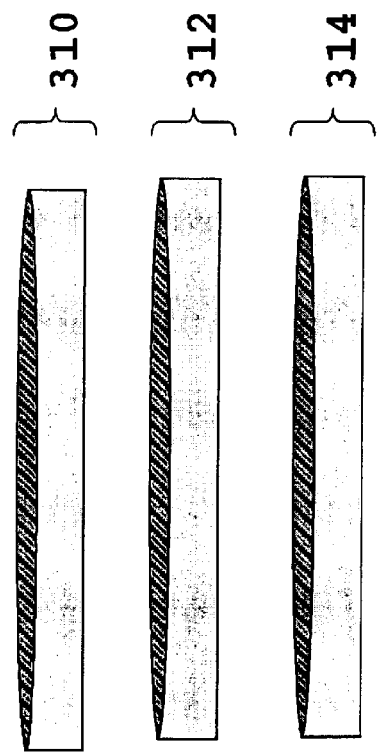
Figure 9D:
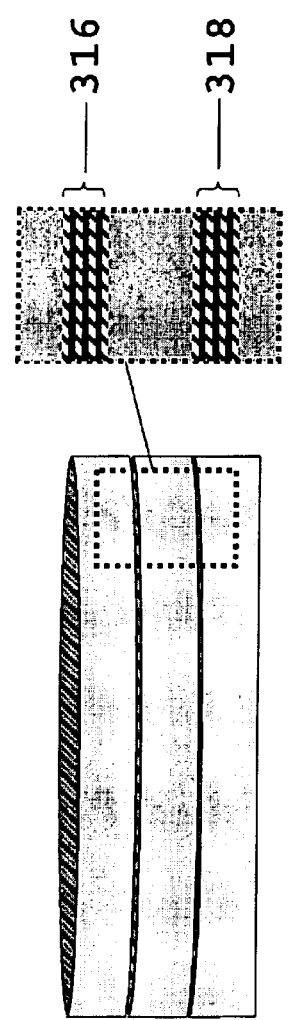

In accordance with additional preferred embodiments, a method for production of stacked, optically coupled etalon wafers is shown in FIGS. 9c–9d. In this embodiment, the stacked, optically coupled etalon wafers are in optical contact. A first etalon wafer 310, a second etalon wafer 312, and a third etalon wafer 314 each comprise the components of the etalon wafer shown and described in FIG. 5 including thin film coatings on both surfaces of a bulk optic wafer. The bulk optic wafer may also comprise a thickness adjustment layer (not shown) and a wedge coating (not shown) underlying the thin films. In the embodiment described here, there is no space between adjacent etalon wafer surfaces after the etalon wafers are placed in optical contact, e.g. near zero space or zero QWOTs exist between the adjacent etalon wafer surfaces. The order of layers of the thin films may be altered to provide for alternating high and low refractive oxide layers after the etalon wafers are stacked and optically coupled. For example, if the thin film comprises a high refractive index oxide layer, a low refractive index oxide layer, followed by a high refractive index oxide layer (H/L/H), then to insure that alternating layers exist in the stacked, optically coupled etalons wafers, an additional low refractive index oxide layer may be deposited onto one or more of the etalon wafers. In this example, after joining the etalon wafers the order of the oxide layers between the two bulk optic wafers would be H/L/H/L/H/L/H (see 316 and 318 FIG. 9d), where each oxide layer has approximately the same thickness, e.g. an integral number of half waves. One skilled in the art will recognize, given the benefit of this disclosure, that additional etalon wafers may be coupled to third etalon wafer 314 using the method just described. In other embodiments, the thickness of the outermost thin film coating is reduced such that after joining the etalon wafers together, the thin film coatings comprise alternating high and low refractive index oxide layers of approximately equal thickness.

Figure 10A:
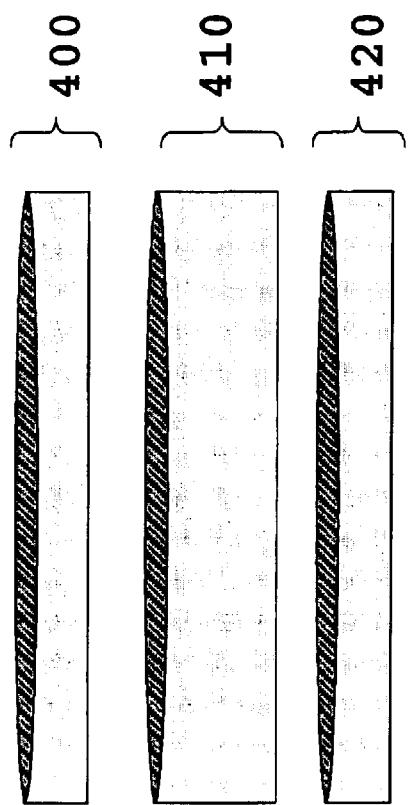
FIGS. 10a–10b is a sequential process of one embodiment for making stacked, optically coupled etalon wafers wherein one of the etalon wafers has a larger cavity spacing than the other etalon wafers.
Figure 10B:
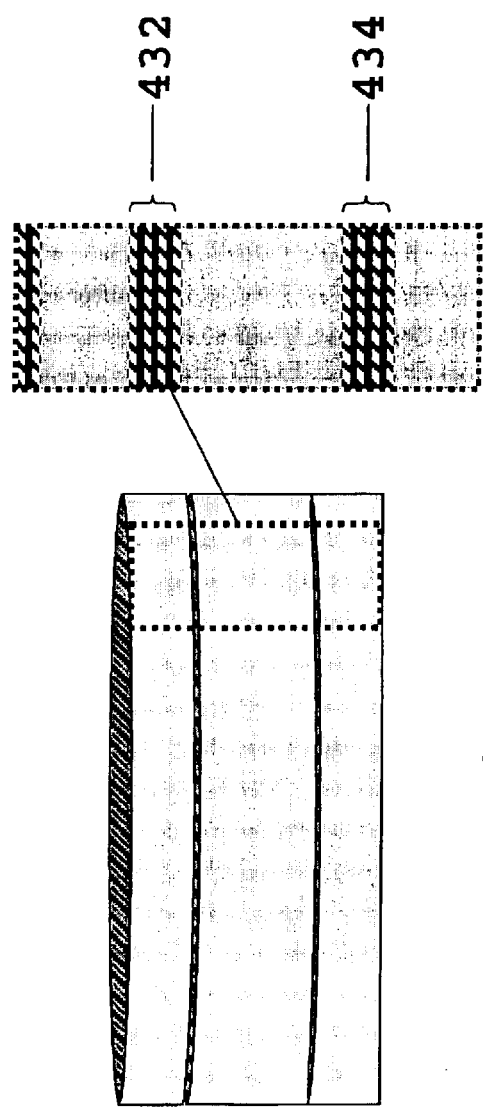

In accordance with additional preferred embodiments, a method for production of stacked, optically coupled etalon wafers, wherein at least one of the etalon wafers has a different cavity spacing than the other etalon wafers in the stack, is shown in FIGS. 10a–10b. In this embodiment, the stacked, optically coupled etalon wafers are in optical contact. A first etalon wafer 400, a second etalon wafer 410, and a third etalon wafer 420 each comprise the components of the etalon wafer shown and described in FIG. 5 including thin film coatings on both surfaces of a bulk optic wafer. The bulk optic wafer may also comprise a thickness adjustment layer (not shown) and a wedge coating (not shown) underlying the thin films. Etalon wafer 410 comprises different cavity spacing than etalon wafers 400 and 420. Because the cavity spacing is different, the optical performance characteristics of etalon wafer 410 and etalon wafers 400 and 420 may be selected such that when etalon wafers 400, 410, and 420 are stacked and optically coupled, only a single passband of multiplexed light is allowed to pass through the optically coupled, stacked etalon wafers, e.g. the optically coupled, stacked etalon wafers can act as a passband filter. In the embodiment described here, there is no space between adjacent etalon wafer surfaces after the etalon wafers are placed in contact, e.g. near zero space or zero QWOTs exist between the adjacent etalon wafer surfaces. In other embodiments, a bonding material may be used to couple the etalon wafers together. If a bonding material is used, the space between adjacent etalon wafer surfaces is preferably equal to an odd number of QWOTs. The order of layers of the thin films may be altered to provide for alternating high and low refractive oxide layers after the etalon wafers are stacked and optically coupled. For example, if the thin film comprises a high refractive index oxide layer, a low refractive index oxide layer, followed by a high refractive index oxide layer (H/L/H), then to insure that alternating layers exist in the stacked, optically coupled etalons wafers, an additional low refractive index oxide layer may be deposited onto one or more of the etalon wafers. In this example, after joining the etalon wafers the order of the oxide layers between the two bulk optic wafers would be H/L/H/L/H/L/H (see 432 and 434 in FIG. 10b), where each oxide layer has approximately the same thickness, e.g. an integral number of half waves. One skilled in the art will recognize, given the benefit of this disclosure, that additional etalon wafers may be coupled to third etalon wafer 420 using the method just described. In other embodiments, the thickness of the outermost thin film coating is reduced such that after joining the etalon wafers together, the thin film coatings comprise alternating high and low refractive index oxide layers of approximately equal thickness.

Although the present invention has been described above in terms of specific embodiments, it is anticipated that other uses, alterations and modifications thereof will become apparent to those skilled in the art given the benefit of this disclosure. It is intended that the following claims be read as covering such alterations and modifications as fall within the true spirit and scope of the invention.

What is claimed is:

1. An optical element wafer comprising stacked, optically matched and optically coupled etalon wafers, at least one of the optically coupled etalon wafers comprising first and second selectively transparent thin film mirror coatings on opposite first and second surfaces, respectively, of a bulk optic wafer having a diameter of at least 1 inch, the bulk optic wafer comprising an optically transparent body and the bulk optic wafer defining the cavity spacing of the etalon wafer, wherein the bulk optic wafer further comprises a wedge coating overlying the optically transparent body.

2. The optical element wafer of claim 1, wherein the wedge coating and the optically transparent body are formed of substantially the same material.

3. The optical element wafer of claim 1, wherein the wedge coating is formed of material comprising a similar refractive index as material comprising the optically transparent body.

4. The optical element wafer of claim 3, wherein differences in refractive index of the material comprising the wedge coating and the material comprising the optically transparent body is less than about ±0.01.

5. The optical element wafer of claim 1, wherein the wedge coating at its thickest point has a thickness of less than about 100 nm.

6. The optical element wafer of claim 1, wherein the bulk optic wafer further comprises a thickness-adjustment layer overlying the optically transparent body.

7. The optical element wafer of claim 6, wherein the thickness-adjustment layer has a substantially uniform thickness greater than 0 and less than 100 microns.

8. The optical element wafer of claim 6, wherein the thickness-adjustment layer and the optically transparent body are formed of substantially the same material.

9. The optical element wafer of claim 6, wherein the thickness-adjustment layer is formed of material comprising a similar refractive index as material comprising the optically transparent body.

10. The optical element wafer of claim 9, wherein differences in refractive index of the material comprising the thickness-adjustment layer and the material comprising the optically transparent body is less than about ±0.01.

11. An optical element wafer comprising stacked, optically matched and optically coupled etalon wafers, at least one of the optically coupled etalon wafers comprising first and second selectively transparent thin film mirror coatings on opposite first and second surfaces, respectively, of a bulk optic wafer having a diameter of at least 1 inch, the bulk optic wafer comprising an optically transparent body and the bulk optic wafer defining the cavity spacing of the etalon wafer, wherein each of the optically coupled etalon wafers is spaced from an adjacent one of the optically coupled etalon wafers a distance equal to an odd number of QWOTs.

12. An optical element wafer comprising stacked, optically matched and optically coupled etalon wafers, at least one of the optically coupled etalon wafers comprising first and second selectively transparent thin film mirror coatings on opposite first and second surfaces, respectively, of a bulk optic wafer having a diameter of at least 1 inch, the bulk optic wafer comprising an optically transparent body and the bulk optic wafer defining the cavity spacing of the etalon wafer, wherein each of the optically coupled etalon wafers is spaced from an adjacent one of the optically coupled etalon wafers a distance equal to substantially zero QWOTs.

13. An optical element wafer comprising stacked, optically matched and optically coupled etalon wafers, at least one of the optically coupled etalon wafers comprising first and second selectively transparent thin film mirror coatings on opposite first and second surfaces, respectively, of a bulk optic wafer having a diameter of at least 1 inch, the bulk optic wafer comprising an optically transparent body and the bulk optic wafer defining the cavity spacing of the etalon wafer, further comprising a bonding layer attaching a first etalon wafer of the optically coupled etalon wafers to an adjacent etalon wafer.

14. The optical element wafer of claim 13, wherein the bonding layer is in an optical path through the optically coupled etalon wafers and optically couples the first etalon wafer to the adjacent etalon wafer.

15. The optical element wafer of claim 13, wherein the bonding layer is substantially out of an optical path through the optically coupled etalons.

16. The optical element wafer of claim 13, wherein the bonding layer comprises a material selected from the group consisting of adhesives, epoxies, and fritted glass.

17. The optical element wafer of claim 13, wherein the bonding layer comprises spacer beads in an adhesive, a mono-layer of the spacer beads establishing the adhesive thickness between the first etalon wafer and the adjacent etalon wafer.

18. The optical element wafer of claim 13, wherein the bonding layer comprises fritted glass.

19. An optical element wafer comprising stacked, optically matched and optically coupled etalon wafers, at least one of the optically coupled etalon wafers comprising first and second selectively transparent thin film mirror coatings on opposite first and second surfaces, respectively, of a bulk optic wafer having a diameter of at least 1 inch, the bulk optic wafer comprising an optically transparent body and the bulk optic wafer defining the cavity spacing of the etalon wafer, wherein a first etalon wafer of the optically coupled etalon wafers is attached to, and spaced from, an adjacent etalon wafer by stand-offs.

20. The optical element wafer of claim 19, wherein the stand-offs are not in an optical path through the optically coupled etalons.

21. The optical element wafer of claim 20, wherein the stand-offs are formed of fritted glass.

* * * * *

UNITED STATES PATENT AND TRADEMARK OFFICE
CERTIFICATE OF CORRECTION

PATENT NO. : 6,896,949 B1
DATED : May 4, 2005
INVENTOR(S) : Michael A. Scobey et al.

It is certified that error appears in the above-identified patent and that said Letters Patent is hereby corrected as shown below:

Title page,
Item [73], Assignee, should read -- Bookham (US) Inc., Abingdon (GB) -- not "Bookham (US) Inc., Abington (GB)".

Signed and Sealed this

Thirtieth Day of August, 2005

JON W. DUDAS
*Director of the United States Patent and Trademark Office*